United States Patent Office 3,803,265
Patented Apr. 9, 1974

3,803,265
MANUFACTURE OF IMPACT-RESISTANT
METHYL METHACRYLATE POLYMERS
Russell K. Griffith, Chagrin Falls, and John F. Jones, Cuyahoga Falls, Ohio, assignors to The Standard Oil Company, Cleveland, Ohio
No Drawing. Filed May 10, 1972, Ser. No. 252,092
Int. Cl. C08f 15/16, 15/22, 15/40
U.S. Cl. 260—879     3 Claims

ABSTRACT OF THE DISCLOSURE

Impact-resistant polymers which have excellent physical properties are prepared by polymerizing methyl methacrylate and optionally a comonomer copolymerizable therewith to at least about 70% conversion, and then introducing into the polymerization reaction medium a conjugated diene monomer, such as butadiene-1,3, and completing the polymerization reaction.

---

The present invention relates to the manufacture of methyl methacrylate resins and more particularly pertains to a novel process for the production of impact-resistant methyl methacrylate resins which have excellent physical properties.

The prior art processes for the manufacture of impact-resistant, rubber-modified resins usually require at least two steps, i.e., rubber preparation and graft polymerization of the resin monomers in the presence of the preformed rubber.

The products of the novel process of the present invention, which appear to have all of the desired properties usually found in rubber-modified resins such as impact resistance, clarity, and processability, can be prepared in a single reactor from simple monomeric materials and do not require the inclusion of a preformed rubber of any type. The products of the present invention are prepared by polymerizing a major proportion of methyl methacrylate and optionally a minor proportion of another monovinyl monomer copolymerizable therewith to a conversion of at least about 70% by weight of monomers to polymer, and then the polymerization is continued in the presence of a conjugated diene monomer, such as butadiene-1,3.

The conjugated diene monomers useful in the present invention include butadiene-1,3, isoprene, chloroprene, bromoprene, cyanoprene, 2,3-dimethyl-butadiene-1,3, and the like. Most preferred for the purpose of this invention are butadiene-1,3 and isoprene because of their ready availability and their excellent copolymerization properties.

The other monovinyl monomers which may be copolymerized with methyl methacrylate embodied in this invention include other methacrylate esters such as ethyl methacrylate, the butyl methacrylates, the amyl methacrylates, the hexyl methacrylates, the dodecyl methacrylates, and the like; the acrylate esters including methyl acrylate, ethyl acrylate, the propyl acrylates, the butyl acrylates, the amyl acrylates, the hexyl acrylates, the heptyl acrylates, the octyl acrylates, and the like; the vinyl esters including vinyl acetate, the vinyl propionates, the vinyl butyrates, isopropenyl acetate, and the like; the vinyl ethers including methyl vinyl ether, ethyl vinyl ether, the propyl vinyl ethers, the butyl vinyl ethers, the pentyl vinyl ethers, the hexyl vinyl ethers, and the like; the vinyl nitriles including acrylonitrile, methacrylonitrile, vinylidene cyanide, methylene glutaronitrile, and the like; the vinyl amides such as acrylamide, methacrylamide, N-vinyl pyrrolidone, P-vinyl benzamide, and the like; and the vinyl halides such as vinyl chloride, vinyl bromide, vinyl fluoride, vinylidene chloride, tetrafluoroethylene, and the like; and the vinyl aromatic compounds such as styrene, alpha methyl styrene, the vinyl toluenes, the vinyl xylenes, the chloro styrenes, and the like.

The polymers of the present invention can be prepared by any of the known general techniques of emulsion or suspension polymerization by batch, continuous or intermittent addition of the monomers and other components just so long as the conjugated diene monomer component is not added until at least about 70% by weight of the other monomer components is converted to polymer. The preferred method is aqueous emulsion or suspension polymerization. The polymerization is preferably carried out in an aqueous medium in the presence of an emulsifying agent and a free-radical generating polymerization initiator at a temperature of from about 0 to 100° C. in the substantial absence of molecular oxygen. The simultaneous interpolymerization of the conjugated diene monomer, the methyl methacrylate and optionally the other monomer does not produce polymeric products which resemble the polymeric products which result from the process of this invention.

The preferred polymeric compositions embodied herein are those resulting from the polymerization to at least 70% by weight conversion of 100 parts by weight of (A) from 60 to 100% by weight of methyl methacrylate and (B) from 0 to 40% by weight of another monovinyl monomer copolymerizable with (A), and then including in the polymerization medium from 1 to 40 parts by weight per 100 parts of (A) plus (B) of (C) a monomer component composed of at least one conjugated diene monomer selected from the group consisting of butadiene-1,3 and isoprene with optionally a small amount of monovinyl monomer, and continuing the polymerization to a final conversion of from 80 to 100% by weight of monomers to polymer.

More specifically, the present invention can be illustrated by the polymerization of methyl methacrylate to a conversion of at least about 80% by weight of monomers to polymer, and then including butadiene-1,3 in the polymerization mixture, and completing the polymerization reaction to produce a polymer having excellent impact strength and other desirable physical properties.

In the following illustrative polymerization, it is preferred that from about 1 to 40, and preferably 1 to 20, parts by weight of the conjugated diene monomer component be employed in the polymerization according to the process of this invention for each 100 parts by weight of combined methyl methacrylate and other monovinyl monomer components. It has been found that as the relative amount of the diene monomer component is increased in the final polymeric product, the impact strength increases and some other physical properties such as heat distortion temperature decrease somewhat. It is generally preferred to use just enough of the conjugated diene monomer component to impart the desired impact strength to the polymeric product and, at the same time, to retain the optimum physical properties of the polymeric product.

The polymeric products of the process of this invention are readily processable, impact-resistant (i.e., having notched Izod impact strengths of at least 0.5 foot pounds per inch of notch), thermoplastic materials which can be thermoformed into a wide variety of useful articles in any of the conventional ways employed with known thermoplastic polymeric materials such as extrusion, milling, molding, drawing, blowing, etc. The polymeric products of this invention have excellent physical properties, and they are useful in the fabrication of useful articles such as brush handles, glazing, toys, containers for foods and beverages, and the like.

In the following illustrative examples, the amounts of ingredients are expressed in parts by weight unless otherwise specified.

EXAMPLE 1

(A) A copolymer of methyl methacrylate and acrylonitrile was prepared using the following ingredients:

| Ingredient: | Parts |
|---|---|
| Water | 250 |
| Sodium lauryl sulfate | 1.0 |
| Methyl methacrylate | 75 |
| Acrylonitrile | 25 |
| Limonene dimercaptan | 0.3 |
| $(NH_4)_2S_2O_8$ | 0.05 |

The polymerization was carried out at 60° C. in the substantial absence of oxygen with stirring for 16 hours to 97.3% conversion. A small portion of the resin was coagulated and dried and was found to have the following properties:

| | |
|---|---|
| Brabender plasticorder torque (at 230° C. and 35 r.p.m. to constant torque), meter grams | 1010 |
| ASTM heat distortion temperature, ° C. | 78.5 |
| Flexural strength ($\times 10^3$ p.s.i.) | 10.9 |
| Flexural modulus ($\times 10^5$ p.s.i.) | 5.08 |
| Tensile strength ($\times 10^3$ p.s.i.) | 11.7 |
| Notched Izod impact strength, foot pound per inch of notch | 0.22 |

(B) The above latex was treated with 19.3 parts of butadiene-1,3 and 1.94 parts of 0.1 molar aqueous solution of $(NH_4)_2S_2O_8$ and the polymerization was continued at 60° C. for 7 more hours. The final resin which was obtained in 95.5% by weight conversion was found to have the following properties:

| | |
|---|---|
| Brabender plasticorder torque, meter grams | 1540 |
| ASTM heat distortion temperature, ° C. | 71 |
| Flexural strength ($\times 10^3$ p.s.i.) | 8.76 |
| Flexural modulus ($\times 10^5$ p.s.i.) | 2.6 |
| Tensile strength ($\times 10^3$ p.s.i.) | 6.6 |
| Notched Izod impact strength, foot pounds per inch of notch | 1.5 |

EXAMPLE 2

(A) A polymethyl methacrylate resin was prepared in aqueous latex by a procedure like that described in Example 1 using the following ingredients:

| Ingredient: | | |
|---|---|---|
| Water | parts | 250 |
| Sodium lauryl sulfate | do | 1.0 |
| Methyl methacrylate | do | 100 |
| Limonene dimercaptan | do | 0.5 |
| $(NH_4)_2S_2O_8$ | do | 0.05 |
| Temperature | ° C | 60 |
| Polymerization time | hours | 4 |

The latex was obtained in 99.7% conversion in this time. A sample of the resin was isolated and was found to have the following properties:

| | |
|---|---|
| Brabender plasticorder torque, meter grams | 1200 |
| ASTM heat distortion temperature, ° C. | 90 |
| Flexural strength ($\times 10^3$ p.s.i.) | 7.79 |
| Flexural modulus ($\times 10^5$ p.s.i.) | 4.5 |
| Tensile strength ($\times 10^3$ p.s.i.) | 5.25 |
| Notched Izod impact strength, foot pound per inch of notch | 0.17 |

(B) The latex from (A) of this example was treated with 19.4 parts of butadiene-1,3 and 1.9 parts of 0.1 molar aqueous solution of $(NH_4)_2S_2O_8$ at 70° C. for 16.1 hours. The final resin, at 93.2% conversion, was found to have the following properties:

| | |
|---|---|
| Brabender plasticorder torque, meter grams | 1470 |
| ASTM heat distortion temperature, ° C. | 97.5 |
| Flexural strength ($\times 10^3$ p.s.i.) | 11.0 |
| Flexural modulus ($\times 10^5$ p.s.i.) | 2.97 |
| Notched Izod impact strength, foot pounds per inch of notch | 1.4 |

EXAMPLE 3

(A) The procedure of Example 1(A) was repeated using the following ingredients:

| Ingredient | | |
|---|---|---|
| Water | parts | 250 |
| Sodium lauryl sulfate | do | 1.0 |
| Methyl methacrylate | do | 75 |
| Acrylonitrile | do | 25 |
| Limonene dimercaptan | do | 0.7 |
| $(NH_4)_2S_2O_8$ | do | 0.05 |
| Temperature | ° C | 60 |
| Time | hours | 6 |

The polymerization was carried to 94.4% conversion. A sample of this resin was found to have the following properties:

| | |
|---|---|
| Brabender plasticorder torque, meter grams | 290 |
| ASTM heat distortion temperature, ° C. | 72 |
| Flexural strength ($\times 10^3$ p.s.i.) | 8.8 |
| Flexural modulus ($\times 10^5$ p.s.i.) | 5.5 |
| Tensile strength ($\times 10^3$ p.s.i.) | 10.4 |
| Notched Izod impact strength, foot pound per inch of notch | 0.19 |

(B) The latex from (A) of this example was treated with 17.5 parts of butadiene-1,3 and 1.9 parts of 0.1 molar aqueous solution of $(NH_4)_2S_2O_8$ and the polymerization was continued for 6 hours at 70° C. The final resin which was obtained in 96.2% conversion was found to have the following properties:

| | |
|---|---|
| Brabender plasticorder torque, meter grams | 560 |
| ASTM heat distortion temperature, ° C. | 65 |
| Flexural strength ($\times 10^3$ p.s.i.) | 8.64 |
| Flexural modulus ($\times 10^5$ p.s.i.) | 2.64 |
| Tensile strength ($\times 10^3$ p.s.i.) | 6.14 |
| Notched Izod impact strength, foot pound per inch of notch | 0.7 |

EXAMPLE 4

A resin which is outside the scope of the present invention was prepared by batch polymerization of a mixture of methyl methacrylate and butadiene-1,3 using the following ingredients:

| Ingredient: | Parts |
|---|---|
| Water | 250 |
| Sodium lauryl sulfate | 1.0 |
| Methyl methacrylate | 100 |
| Butadiene-1,3 | 18 |
| $(NH_4)_2S_2O_8$ | 0.05 |

The polymerization was carried out in the substantial absence of molecular oxygen at 60° C. for 7¼ hours to a conversion of 93.6% by weight of monomers to polymer. The resin was isolated and was found to have the following properties:

| | |
|---|---|
| Brabender plasticorder torque, meter grams | 810 |
| ASTM heat distortion temperature, ° C. | 38 |
| Flexural strength ($\times 10^3$ p.s.i.) | 5.5 |
| Flexural modulus ($\times 10^5$ p.s.i.) | 1.8 |
| Tensile strength ($\times 10^3$ p.s.i.) | 4.5 |
| Notched Izod impact strength, foot pound per inch of notch | 0.21 |

We claim:

1. The process comprising polymerizing in an aqueous emulsion to at least 70% by weight conversion of 100 parts by weight of a monomer component comprising
(A) from about 60 to 100% by weight of methyl methacrylate and
(B) from about 0 to 40% by weight based on the combined weights of (A) plus (B) of acrylonitrile
and then including in the polymerization medium from 1 to 40 parts by weight per 100 parts by weight of (A) plus (B) of
(C) at least one conjugated diene monomer selected from the group consisting of butadiene-1,3 and isoprene.

2. The process of claim 1 carried out in the substantial absence of oxygen and at a temperature in the range of from about 0 to 100° C.

3. The process of claim 2 wherein the polymerization of monomer component (A) plus (B) is carried out to at least 80% by weight conversion before monomer component (C) is included in the polymerization.

References Cited

UNITED STATES PATENTS

| | | | |
|---|---|---|---|
| 3,426,102 | 2/1969 | Solok et al. | 260—879 |
| 3,538,194 | 11/1970 | Barrett et al. | 260—879 |
| 3,699,190 | 10/1972 | Shimomuva | 260—879 X |

JAMES A. SEIDLECK, Primary Examiner

W. F. HAMROCK, Assistant Examiner

U.S. Cl. X.R.

260—29.7 R, 80.7